(No Model.)

W. WILLS.
APPARATUS FOR THE SEPARATION OF SMOKE FROM GASES OF COMBUSTION.

No. 468,378. Patented Feb. 9, 1892.

Witnesses
H. B. Bradshaw
E. E. Bragg

Inventor
William Wills
By his Attorneys
Staley and Shepherd

UNITED STATES PATENT OFFICE.

WILLIAM WILLS, OF LONGSTRETH, OHIO.

APPARATUS FOR THE SEPARATION OF SMOKE FROM GASES OF COMBUSTION.

SPECIFICATION forming part of Letters Patent No. 468,378, dated February 9, 1892.

Application filed August 3, 1891. Serial No. 401,594. (No model.) Patented in England November 22, 1886, No. 15,171.

*To all whom it may concern:*

Be it known that I, WILLIAM WILLS, a citizen of the United States, residing at Longstreth, in the county of Hocking and State of Ohio, have invented a certain new and useful Improvement in Apparatus for the Separation of Smoke from the Gases of Combustion, (for which I have obtained British Patent No. 15,171, dated November 22, 1886,) of which the following is a specification.

My invention relates to smoke-consuming devices of that class which are designed for the complete abatement of smoke and to render useless tall chimneys.

The objects of my invention are to provide a simple and comparatively inexpensive means for separating and collecting the smoke and heavier particles forming the same from the gases evolved during the combustion of the fuel, to provide superior means for utilizing the gases thus evolved and the fuel, and to obviate the necessity of employing a tall chimney for the outlet of said gases and smoke. These objects I accomplish in the manner illustrated in the accompanying drawings, in which—

Figure 1:
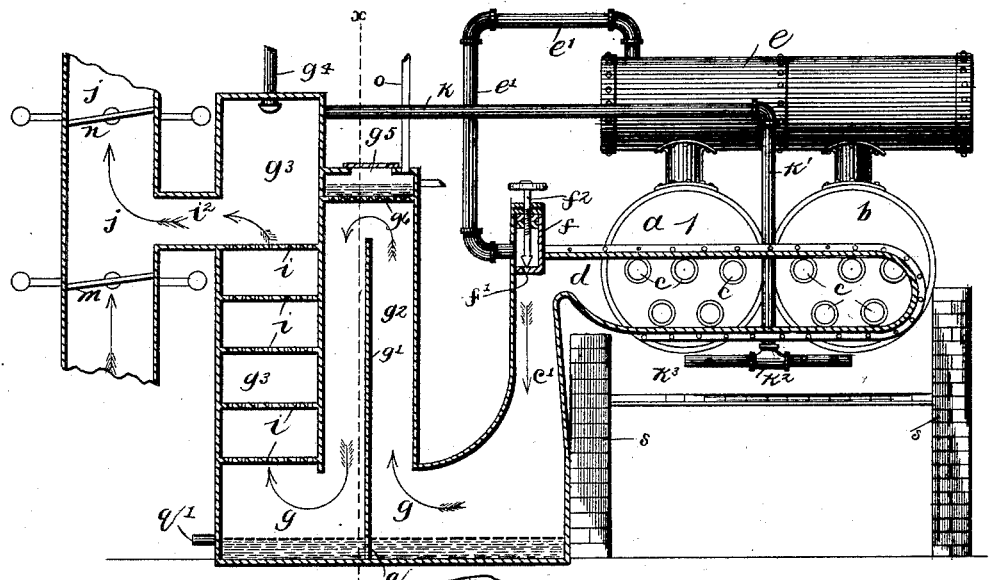
Figure 2:
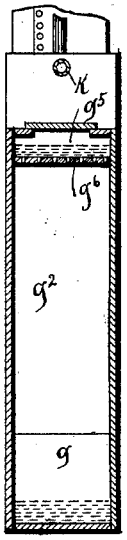

Figure 1 is a central longitudinal sectional view of my improved smoke-consuming apparatus, and Fig. 2 is a transverse section of the same on line $x$ $x$ of Fig. 1.

Similar letters refer to similar parts throughout the several views.

$a$ and $b$ represent, respectively, two steam-boilers of ordinary construction, provided with internal flues $c$ to convey heated gases or products of combustion from a fire-flame in the front to the transverse flue $d$ in the rear.

$e$ represents the steam-chest, which is situated above the boiler.

Communicating with the flue $d$ is the upper portion of the chamber $c'$, the lower portion of which communicates with a tank $g$, the latter being located, as shown, at one side of the furnace-wall $s$. This tank $g$ is provided with a central upward extension or dome $g^2$, into which projects centrally from the bottom of said tank a diaphragm or partition $g'$, the upper termination of which is within a short distance of the upper side of the dome $g^2$. Extending within the tank $g$, adjoining its outer side, is a condensing-flue $g^3$, which is provided at intervals with transverse perforated condensing or cooling plates $i$. The upper portion of this flue $g^3$, which is higher than the dome $g^2$, is provided with a central water-inlet pipe $g^4$ and with a horizontal outlet-pipe $k$ at right angles with said pipe $g^4$, which leads, as shown, to a vertical pipe $k'$, which leads to a point within the fire-box $k^3$, into which it discharges through a suitable horizontal pipe-section $k^2$. Formed at the upper side of the chamber $c'$ at a point near the junction of the latter and the flue $d$, is a valve-casing $f$, the lower end of which is provided with a conical or contracted opening, the smaller end of which communicates with said chamber $c'$, as shown at $f$. This valve-casing $f$ is provided with a screw-valve $f^2$, the lower end of the head of which corresponds in form with and is adapted to be made to enter the contracted opening $f'$. The lower portion of this valve-casing $f$ communicates with the steam-chest $e$ through a suitable steam-pipe $e'$. Formed above the tank-dome $g^2$ is a water-reservoir $g^5$, the perforated bottom $g^6$ of which forms the top plate of said dome. This reservoir $g^5$ is fed by an inlet-pipe $o$.

The upper portion of the condensing-flue $g^3$ above its upper plate $i$ is by a neck $i^2$ made to communicate with a vertical escape-flue $j$, which is provided above and below its connection therewith with the neck $i^2$ with suitable dampers $m$ $n$.

Formed in the lower portion of the tank-partition $g'$ are one or more openings $q$, and leading from the outer portion of said tank, at a point slightly above the bottom thereof, is an outlet-pipe $q'$.

The operation of my device is as follows: Steam from the chest $e$ passes through the pipe $e'$ into the valve-case $f$, from whence it escapes through the contact valve-opening $f'$ into the chamber $c'$. The incoming volume of steam thus forced through the opening $f'$ is sufficiently powerful to create an artificial draft or current in the direction of the arrows shown in chamber $c'$ to result in a drawing of the heated gases or products of combustion from the flues $c$ into the chamber $c'$, through which they are urged by said artificial draft into the tank $g$, and in the dome leading therefrom the products of combustion are submitted to a continuous spray of water, which flows from the perforated flue $g^6$ of the reservoir $g^5$. This contact of the incoming water-spray and the moving products of combustion causes the particles of carbon and solid matter suspended in and carried with the passing gases to gradually fall and settle upon the surface of the water in the lower portion of the tank $g$. As shown by the arrow, the course of the products of combustion is upward and thence downward through the dome of the tank over the partition or diaphragm $g'$. The carbon and other particles separated from the gas and collected on the water of the tank are drawn off through the pipe $q'$, together with the surplus water which collects within the tank. The heated gases and steam, being now separated from the smoke, enter the cooling or condensing flue $g^3$, in which a suitable discharge of water from the pipe $g^4$ insures the effectual condensation of the steam and the cooling of the gases, which is effected through contact of the latter with the plates $i$, through the perforations of which said gases pass. After passing through the perforated plates $i$ the heavy incombustible and invisible gases will pass through the discharge-neck $i^2$, into the flue $j$, and into the atmosphere, while the lighter inflammable gases will rise to the top of the flue $g^3$ and pass therefrom through the pipes $k\,k'\,k^2$ into the fire-box, where they will be consumed to assist in the generation of steam.

In commencing operations the supply of water is shut off at $o$ and $g^4$ and the lower damper $m$ turned to allow a natural draft to withdraw the products of combustion (in the usual and well-known manner) from the flues until sufficient steam is generated to urge the heated gases through the flues and tank. When using natural draft, communication with an ordinary chimney is or may be established by opening damper $m$ and closing damper $n$, which was previously opened for the escape of purified gases.

Having now fully described my invention, what I claim, and desire to secure by Letters Patent, is—

In an apparatus for separating smoke and gases, the combination of the flue $d$, communicating with the boiler-flues, as described, tank $g$, chamber $c'$, connecting said tank and flue $d$, a condensing-flue leading from said tank, a pipe $k$, connecting said condensing-flue with the fire-box, water-spray devices arranged to deliver into said tank and condensing-flue, steam-chest $e$, valve-case $f$, the latter opening into chamber $c'$, and a pipe $e'$, connecting said steam-chest and valve-case, substantially as specified.

WILLIAM WILLS.

In presence of—
J. R. HICKMAN,
M. O. RANDOLPH.